(12) United States Patent
Tagawa

(10) Patent No.: US 6,559,386 B1
(45) Date of Patent: May 6, 2003

(54) SHEET FOR BATTERY INSULATION AND DISPLAY PANEL PROTECTION

(75) Inventor: Kazusato Tagawa, Tokyo (JP)

(73) Assignee: Sony Computer Entertainment Inc. (JP)

( * ) Notice: Subject to any disclaimer, the term of this patent is extended or adjusted under 35 U.S.C. 154(b) by 155 days.

(21) Appl. No.: 09/598,154

(22) Filed: Jun. 21, 2000

(30) Foreign Application Priority Data

Jun. 23, 1999 (JP) ............................................. 11-177233

(51) Int. Cl.[7] .............................................. H01B 17/00
(52) U.S. Cl. ..................... 174/135; 174/138 R; 206/320
(58) Field of Search .............................. 174/135, 138 E, 174/138 R, 176; 206/305, 320, 576; 362/84, 85, 109; 429/96, 100

(56) References Cited

U.S. PATENT DOCUMENTS

| | | | |
|---|---|---|---|
| 3,776,373 A | * | 12/1973 | Mullen .......................... 206/305 |
| 5,714,716 A | * | 2/1998 | Yamada ....................... 174/52.1 |
| 6,239,968 B1 | * | 5/2001 | Kim et al. .................... 206/320 |
| 6,261,715 B1 | * | 7/2001 | Nakamura et al. ........... 429/100 |
| 6,313,982 B1 | * | 11/2001 | Hino ............................ 206/320 |
| 6,347,796 B1 | * | 2/2002 | Grossman et al. ......... 206/315.1 |

FOREIGN PATENT DOCUMENTS

JP    10-050154    *    2/1998

* cited by examiner

Primary Examiner—Dean A. Reichard
Assistant Examiner—Adolfo Nino
(74) Attorney, Agent, or Firm—Lerner, David, Littenberg, Krumholz & Mentlik, LLP

(57) ABSTRACT

An insulative/protective sheet has a narrower insulator and a wider protector. The insulator is placed in a battery holder of a portable information terminal and electrically insulates a battery and negative electrode terminals from each other in the battery holder. The protector is placed on a color display unit of the portable information terminal and protects a display panel of the color display unit.

11 Claims, 17 Drawing Sheets

SHEET FOR BATTERY INSULATION AND DISPLAY PANEL PROTECTION

BACKGROUND OF THE INVENTION

1. Field of the Invention

The present invention relates to an insulative/protective sheet for battery insulation and display panel protection and a portable information terminal with an insulative/protective sheet for battery insulation and display panel protection, and more particularly to an insulative/protective sheet disposed in a portable information terminal for insulating a battery and electrode terminals from each other and protecting a display panel, and a portable information terminal with such an insulative/protective sheet for battery insulation and display panel protection.

2. Description of the Related Art

Portable information terminals, which are also referred to as PDA (Personal Digital Assistant) having a flat display unit such as a liquid crystal display (LCD) unit, e.g., portable computers, electronic notebooks, portable telephone sets, PHS terminals, pagers, etc. have been in widespread usage. Generally, those portable information terminals employ a battery as an electric power supply.

Entertainment apparatus for downloading a game program from a mass storage unit such as a CD-ROM which is an optical disk to perform a video game or playing back music stored in a CD are also wisely used. There are also commercially available portable information terminals (PDAs) that can removably be connected to entertainment apparatus for downloading a game program via the entertainment apparatus to perform a video game on themselves. Such portable information terminals have a flat display unit such as a liquid crystal display unit, and employ a battery as an electric power supply.

When portable information terminals are shipped as products from the factory, an insulative sheet for providing electric insulation between a built-in battery and electrode terminals to prevent the battery from being unduly consumed is disposed between the built-in battery and the electrode terminals. A protective sheet is placed on a flat display unit for protecting the panel of the flat display unit against scratch.

SUMMARY OF THE INVENTION

It is an object of the present invention to provide an insulative/protective sheet for battery insulation and display panel protection, which can easily be manufactured and can easily be mounted on and removed from a portable information terminal, and a portable information terminal with such an insulative/protective sheet.

According to the present invention, there is provided an insulative/protective sheet comprising an insulator for use between a built-in battery disposed in a portable information terminal and electrode terminals in the portable information terminal, for providing insulation between the battery and the electrode terminals, a protector for being placed on a display panel of the portable information terminal, for protecting the display panel, the insulator and the protector being constructed as a unitary sheet.

The insulative/protective sheet can be manufactured with ease and can easily be mounted on and removed from the portable information terminal.

The unitary sheet may be made of synthetic resin.

A member is disposed on a surface of the insulator which faces the electrode terminals, for reducing frictional forces applied to the electrode terminals. Therefore, when the insulator is pulled from between the battery and the electrode terminals, no strong frictional forces are applied from the sheet to the electrode terminals.

The protector may be transparent. The transparent protector allows the user to visually recognize the display panel through the protector.

The protector may carry a mark and/or letters.

According to the present invention, there is also provided a portable information terminal, comprising a built-in battery, a display panel, and an insulative/protective sheet having an insulator for use between the built-in battery and electrode terminals in the portable information terminal, for providing insulation between the battery and the electrode terminals, and a protector placed on the display panel, for protecting the display panel, the insulator and the protector being constructed of a unitary structure.

The insulative/protective sheet of the portable information terminal can be manufactured with ease. The insulative/protective sheet can easily be mounted on and removed from the portable information terminal.

In the portable information terminal, the unitary sheet may be made of synthetic resin.

In the portable information terminal, a member is disposed on a surface of the insulator which faces the electrode terminals, for reducing frictional forces applied to the electrode terminals. Therefore, when the insulator is pulled from between the battery and the electrode terminals, no strong frictional forces are applied from the sheet to the electrode terminals.

The portable information terminal may further comprises a battery cavity with the electrode terminals disposed therein, the battery being housed in the battery cavity, and a battery cover placed in an open end of the battery cavity, the insulator being inserted in the battery cavity and extending through a gap between the open end of the battery cavity and the battery cover, the insulative/protective sheet being mounted along outer surfaces of the portable information terminal which range from the battery cavity in which the insulator is inserted to the display panel on which the protector is placed.

In the portable information terminal, the protector may be transparent, and may carry a mark and/or letters.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A portable information terminal which incorporates an insulative/protective sheet for battery insulation and display panel protection according to an embodiment of the present invention will first be described below.

Figure 1:
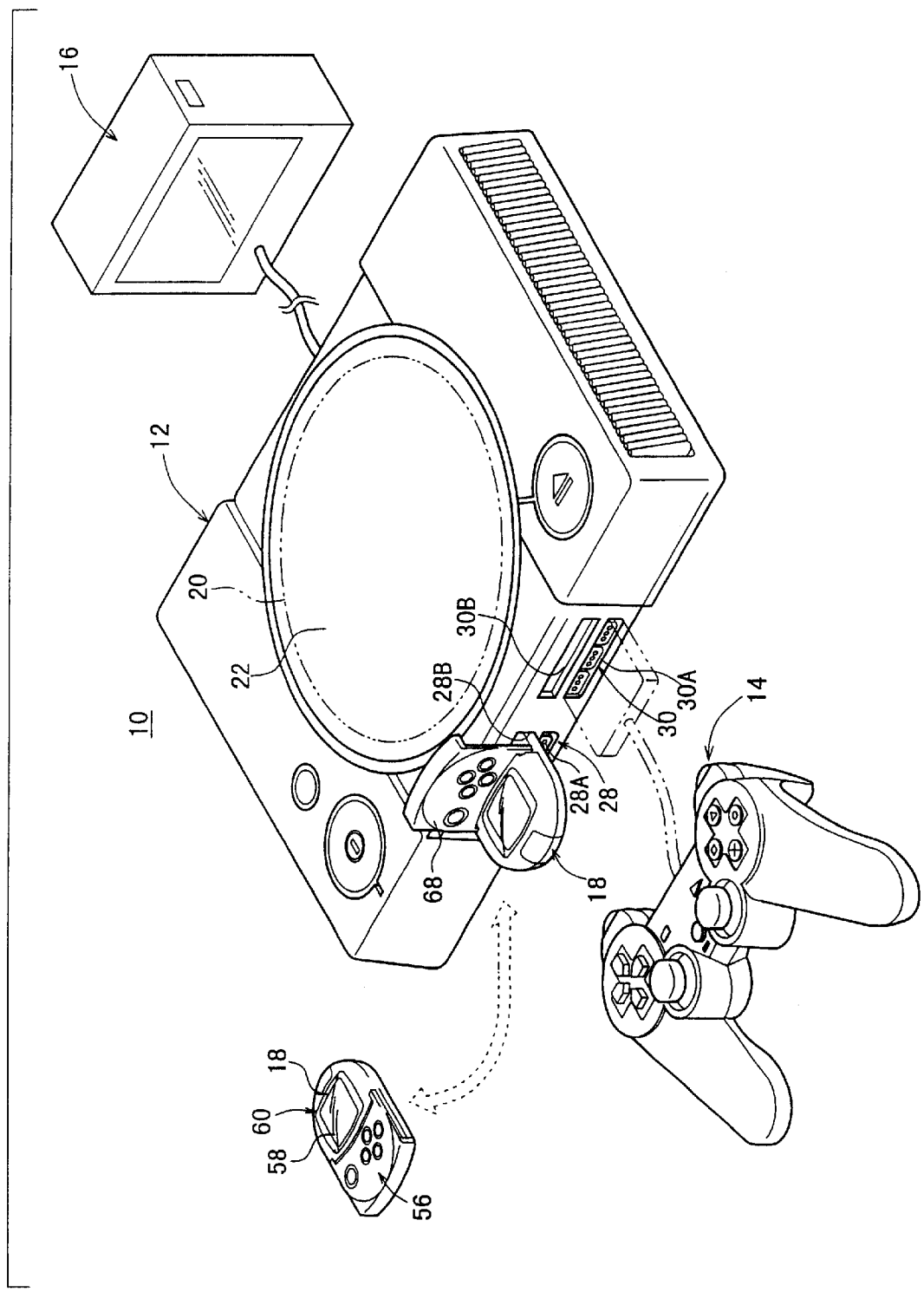
FIG. 1 is a perspective view of an entertainment system including a portable information terminal which incorporates an insulative/protective sheet for battery insulation and display panel protection according to an embodiment of the present invention.

FIG. 1 shows an entertainment system 10 including a portable information terminal 18. As shown in FIG. 1, the entertainment system 10 includes an entertainment apparatus 12, a manual controller 14 detachably connected to the entertainment apparatus 12, a display monitor 16 such as a television receiver which is supplied with video and audio output signals from the entertainment apparatus 12, and the portable information terminal 18 which is detachably connected to the entertainment apparatus 12 and energized by a built-in battery (primary or secondary battery).

The entertainment apparatus 12 can read a program recorded in a mass storage medium such as an optical disk 20 such as a CD-ROM, for example, and execute a game, for example, based on the program depending on commands supplied from the user, e.g., the game player. The execution of the game mainly represents controlling the progress of the game by controlling the display of images and the generation of sounds on the display monitor 16 in response to input signals from the manual controller 14.

The entertainment apparatus 12 is essentially in the shape of a flat rectangular parallelepiped, and has a disk loading unit 22 disposed centrally therein for loading an optical disk 20 storing an application program and data of a video game or the like, and two slot 28, 30, for example.

The entertainment apparatus 12 may be supplied with the application program via a communication link, rather than being supplied from the optical disk 20 as the recording medium.

The slots 28, 30 have respective upper slot units 28B, 30B and respective lower slot units 28A, 30A. Manual controllers 14 can be connected respectively to the lower slot units 28A, 30A. Memory cards (not sown) or portable information terminals 18 which also function as memory cards can be connected respectively to the upper slot units 28B, 30B. The slot 28 (28A, 28B) and the slot 30 (30A, 30B) are of asymmetrical shapes to avoid erroneous insertion of manual controllers and memory cards or portable information terminals.

Figure 2:
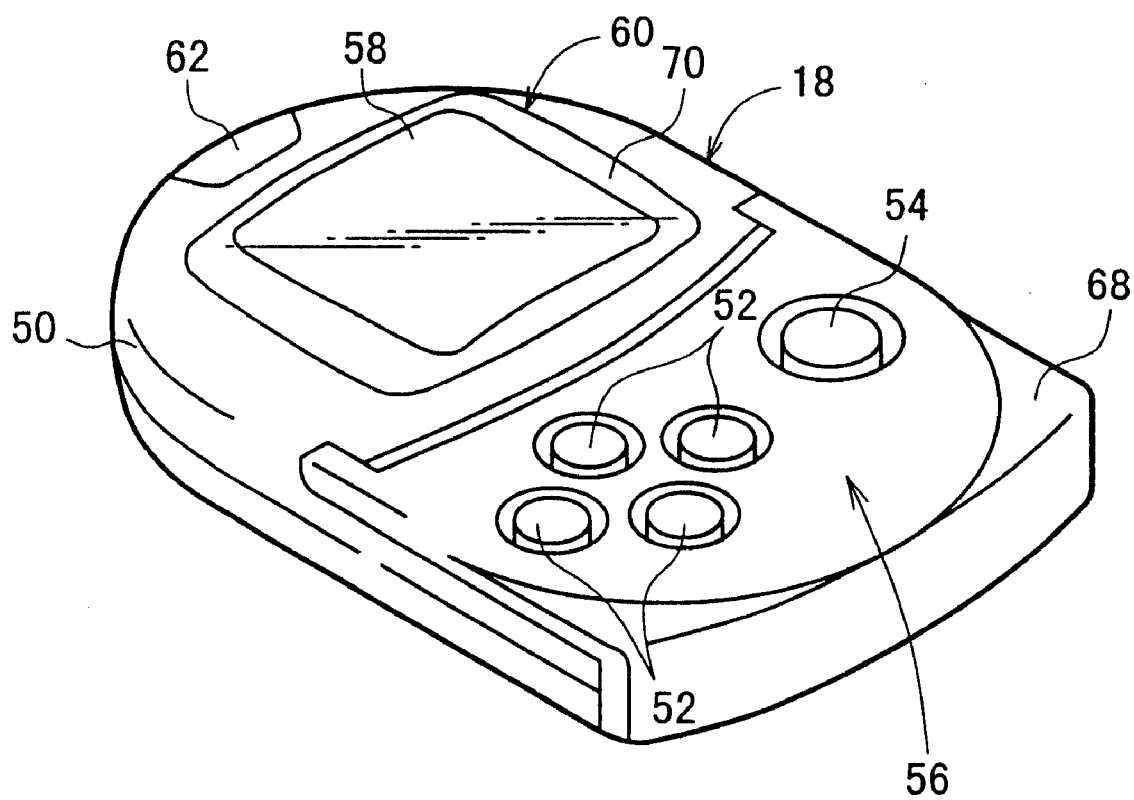
FIG. 2 is a perspective view of the portable information terminal of the entertainment system shown in FIG. 1.
Figure 3:
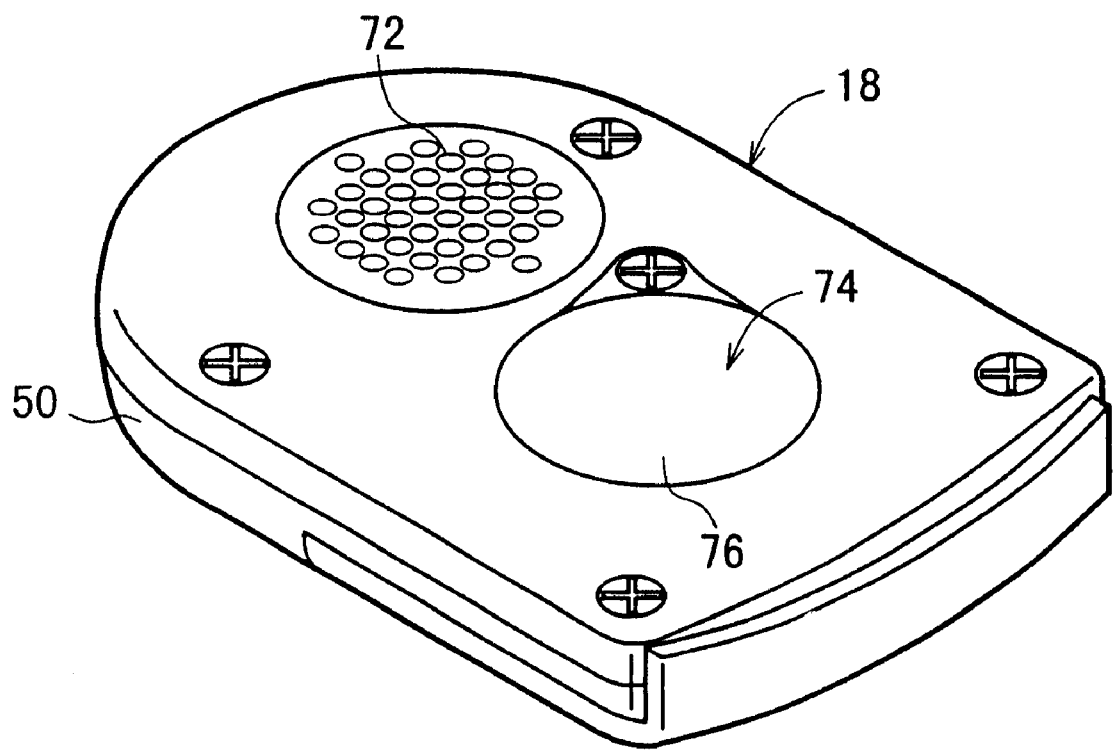
FIG. 3 is a perspective view of the portable information terminal of the entertainment system shown in FIG. 1.

FIGS. 2 and 3 show the appearance of the potable information terminal 18.

As shown in FIG. 2, the portable information terminal 18 has a housing 50 which supports a manual control pad 56 having a plurality of direction buttons 52 and a decision button 54 for entering events and making various selections, a color display unit 60 having a display panel 58 which comprises a TFT (Thin Film Transistor) color liquid crystal display (LCD) unit or the like, and a window 62 for wireless communication via infrared radiation.

The housing 50 houses a board (not shown) which supports a memory device, a CPU, etc. thereon and has a connector (not shown) on a side of one end thereof. A lid 68 is angularly movably supported on the housing 50 for angular movement through about 90 degrees, and the manual control pad 56 is mounted on the lid 68. The manual control pad 56 or the lid 68 occupies a substantially half area of the upper portion of the housing 50 and is positioned remotely from the window 62.

As shown in FIG. 1, the portable information terminal 18 with the lid 68 being open can be inserted into either one of the upper slot units 28B, 30B of the entertainment apparatus 12, and connected to the entertainment apparatus 12 via the connector (not shown). While the portable information terminal 18 is being connected to the entertainment apparatus 12, programs and data are downloaded from the entertainment apparatus 12 into the portable information terminal 18. In this sense, the entertainment apparatus 12 is considered to be a downloading apparatus.

When the portable information terminal 18 is disconnected from the entertainment apparatus 12, stated otherwise, when the portable information terminal 18 is a stand-alone system, the portable information terminal 18 can be operated on a buildin battery to execute a program downloaded from the entertainment apparatus 12.

As shown in FIG. 2, the color display unit 60 occupies a substantially half area of the upper portion of the housing 50 and is positioned near the window 62. The color display unit 60 has a panel protection plate 70 placed over the display panel 58. The panel protection plate 70 is made of synthetic resin such as polycarbonate and is transparent.

As shown in FIG. 3, the housing 50 has in its lower surface a speaker cover 72 which covers a built-in speaker and a battery holder 74. The speaker cover 72 is located in a position underlying the color display unit 60, and the battery holder 74 is located in a position underlying the lid 68 (see also FIG. 2).

As described later on, the battery holder 74 has a battery cavity 88 (see FIG. 7) which holds a battery (primary or secondary battery) 94 therein. The battery cavity 88 with the battery 94 held therein is covered with a battery cover 76.

An insulative/protective sheet for battery insulation and display panel protection according to the present embodiment of the present invention will be described below.

Figure 4:
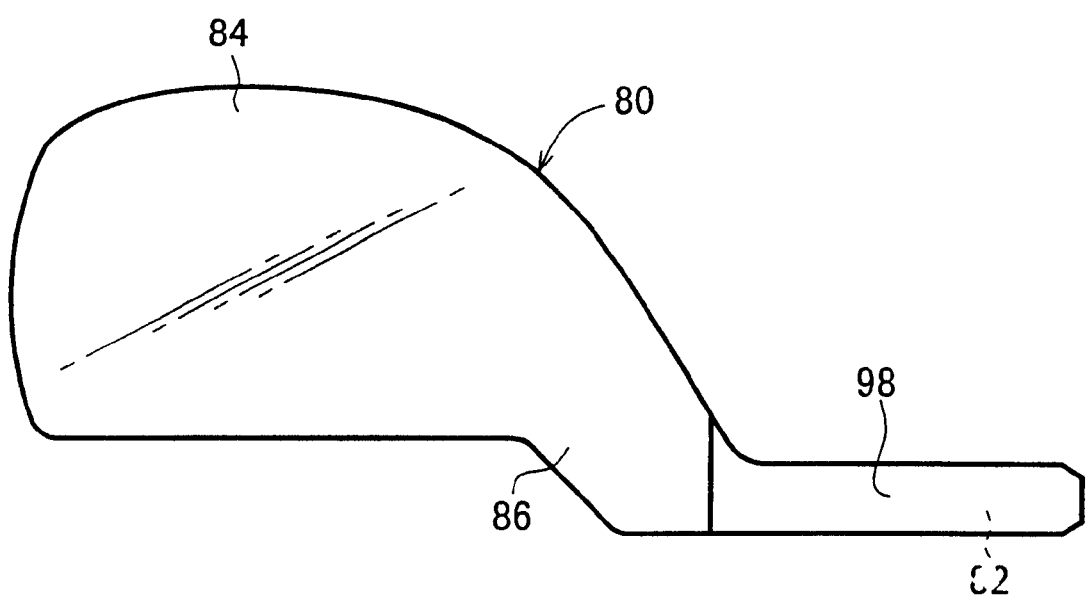
FIG. 4 is a plan view of the sheet for battery insulation and display panel protection according to the embodiment of the present invention.

FIG. 4 shows an insulative/protective sheet (hereinafter simply referred to as sheet) 80 for battery insulation and display panel protection. The sheet 80 is of a unitary structure cut to a desired shape from a soft flexible sheet made of a synthetic resin.

Preferably, the sheet 80 comprises a transparent support layer of polyethylene and a sticky layer of polyolefin disposed on the transparent support layer, e.g., surface protection sheet: tape Nos. 948A–C, manufactured by Teraoka Seisakusho Co. Ltd. The sheet 80 has a thickness of 0.06 mm and exhibits a low level of stickiness, e.g., 0.20 N for the tape No. 948A, 0.05 N for the tape No. 948B, or 0.15 N for the tape No. 948C. Therefore, it is easy to apply the sheet 80 to or peel the sheet 80 off the panel protection plate 70 of the color display unit 60.

The sheet 80 has a narrower insulator 82 and a wider protector 84 which are integrally joined to each other by a substantially Z-shaped bend 86 interposed therebetween. The substantially Z-shaped bend 86 is provided between the insulator 82 and the protector 84 because the color display unit 60 and the battery holder 74 are positionally out of alignment with each other when the portable information terminal 18 is viewed in plan.

Figure 5:
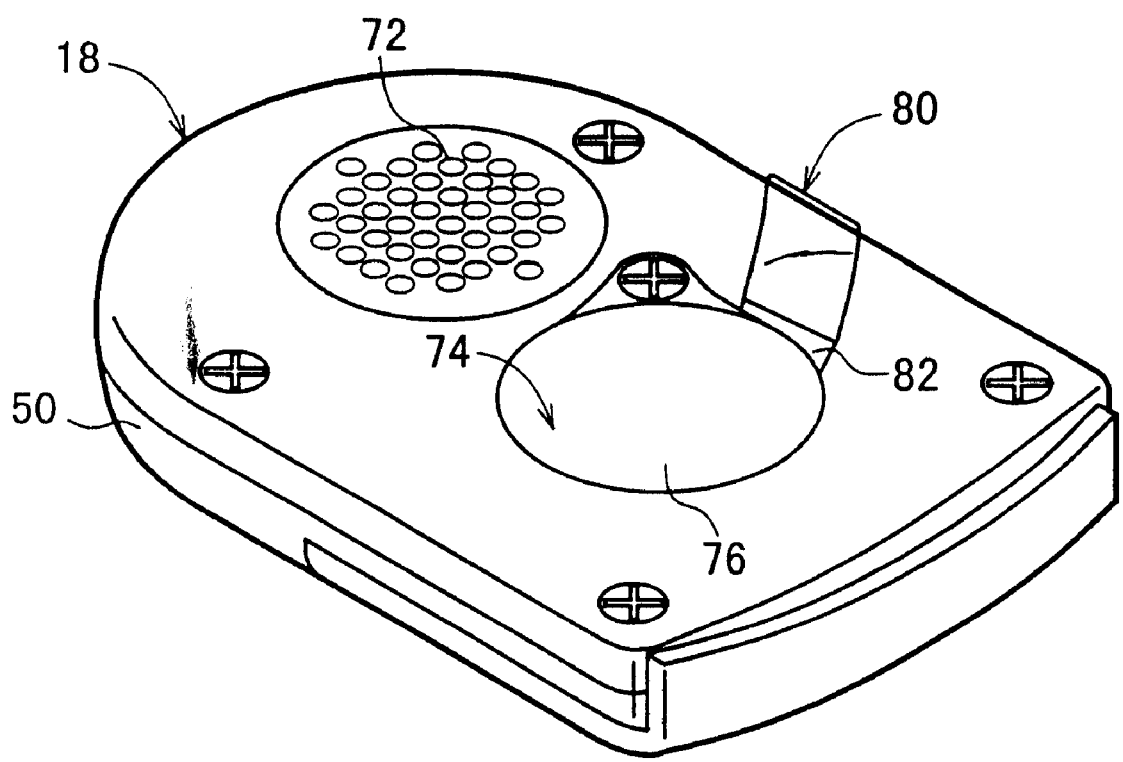
FIG. 5 is a perspective view showing an insulator disposed in a battery holder of the portable information terminal shown in FIG. 3.

As shown in FIG. 5, the insulator 82 is placed in the battery holder 74, and electrically insulates the battery 94 and electrode terminals, e.g., negative electrode terminals 90*a*, 90*b* (see FIG. 7) from each other in the battery cavity 88. The insulator 82 is of a narrow dimension so that it can be placed in the battery holder 74.

Figure 6:
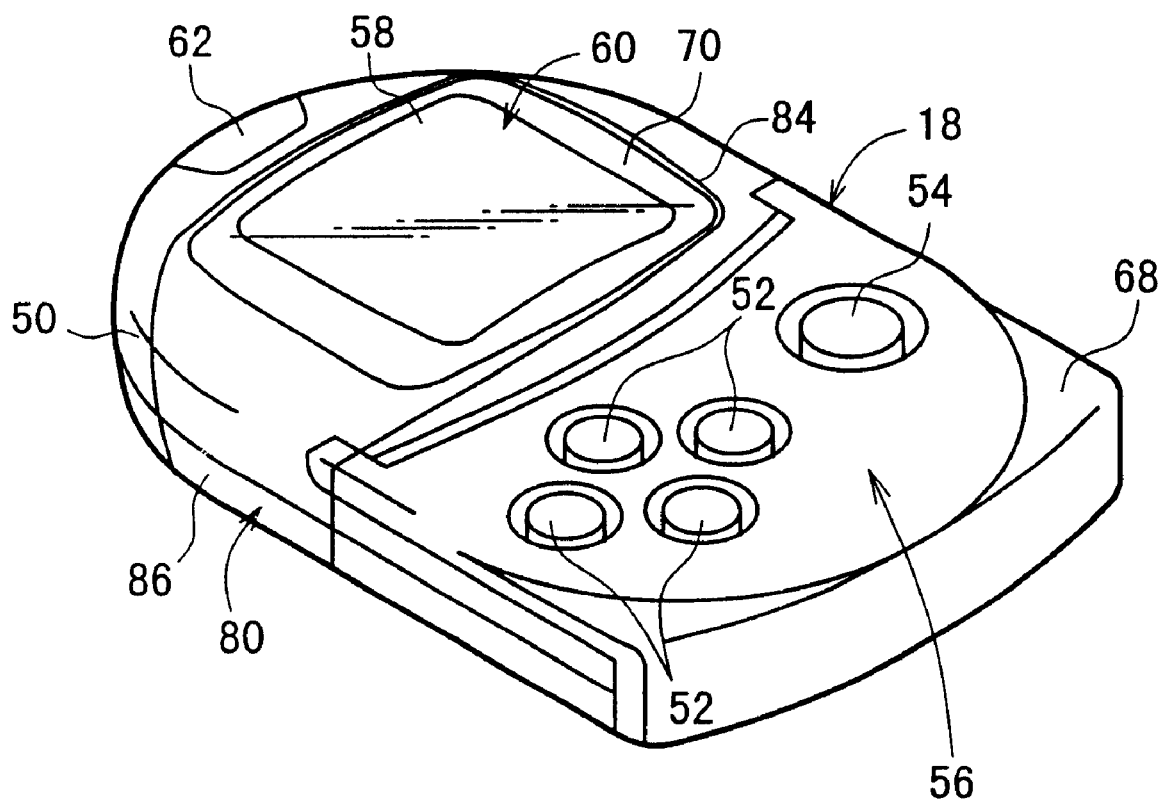
FIG. 6 is a perspective view showing a protector disposed on a color display panel of the portable information terminal shown in FIG. 2.

As shown in FIG. 6, the protector 84 is placed on the surface (display surface) of the panel protection plate 70 of the color display unit 60, and protects the panel protection plate 70. The protector 84 is of a wide dimension so that it can cover the panel protection plate 70 in its entirety.

Figure 7:
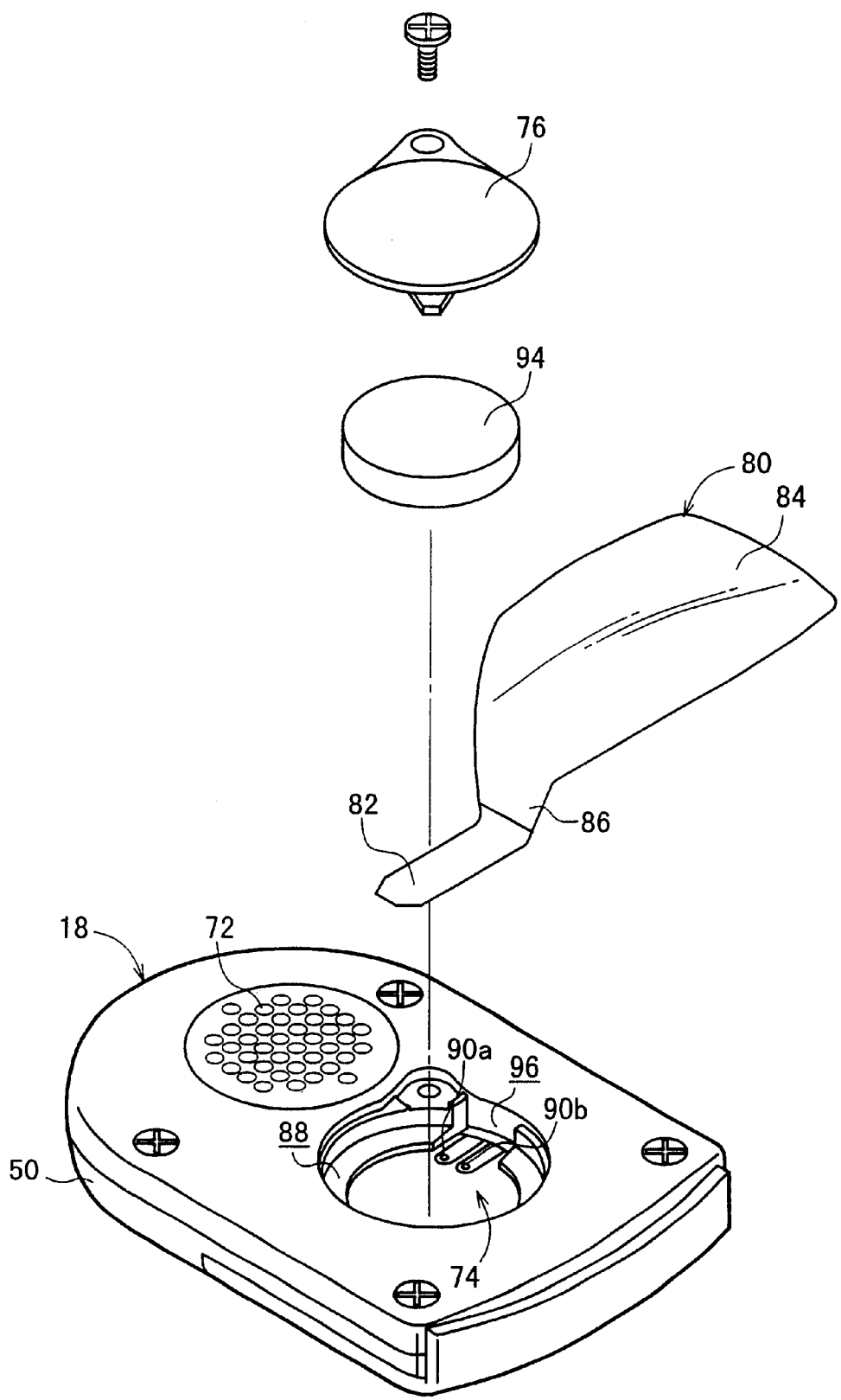
FIG. 7 is an exploded perspective view showing the positional relationship between the insulator and the battery holder shown in FIG. 5.
Figure 8:
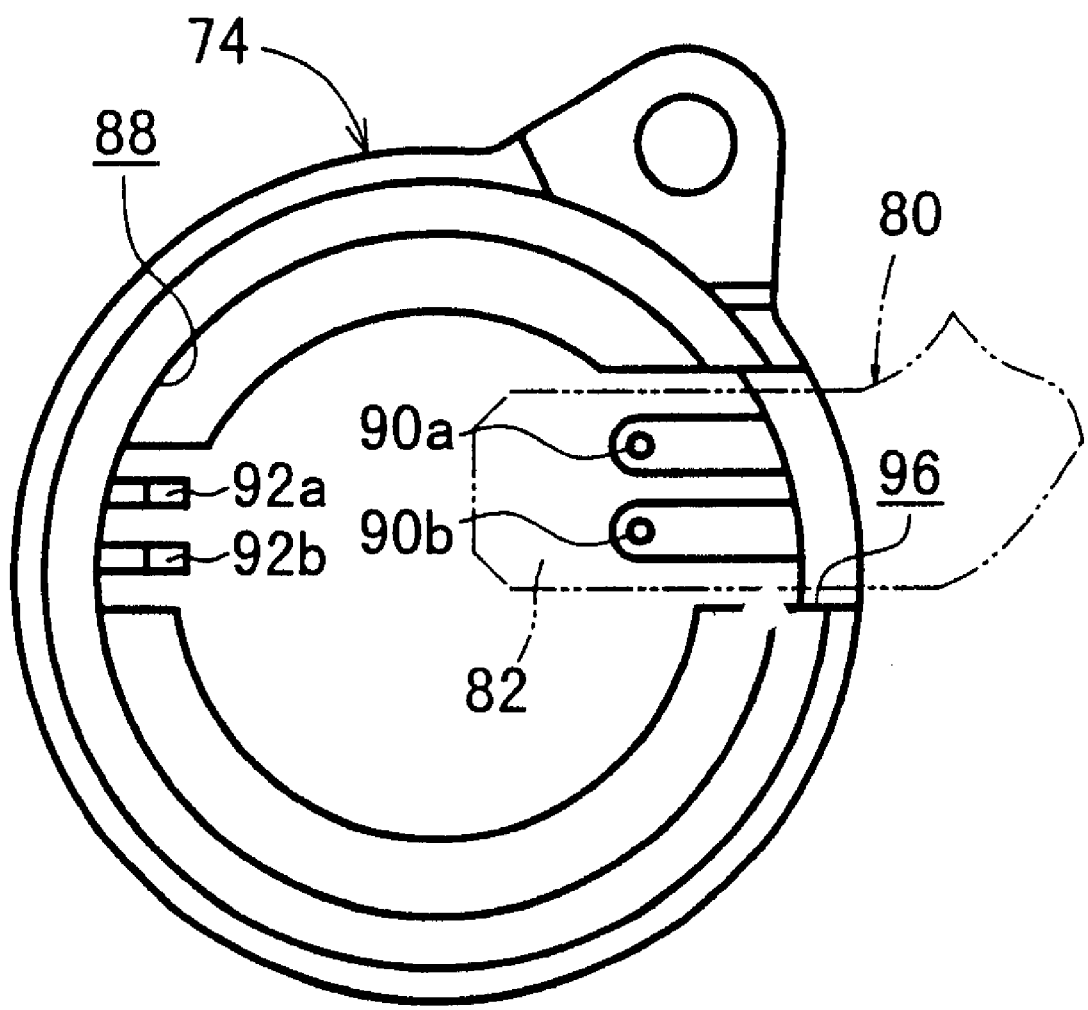
FIG. 8 is a plan view showing the positional relationship between positive electrode terminals and the insulator in the battery holder shown in FIG. 7.

As shown in FIGS. 7 and 8, the negative electrode terminals 90*a*, 90*b* and positive electrode terminals 92*a*, 92*b* are disposed on the bottom of the battery cavity 88 of the battery holder 74.

Figure 9:
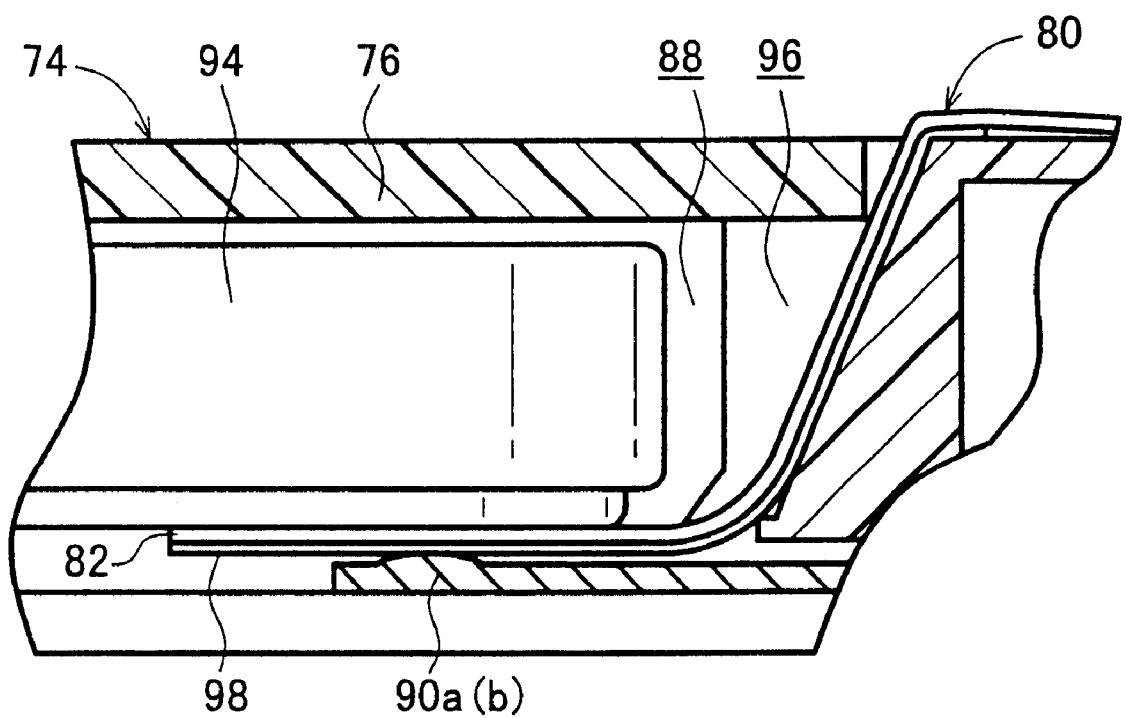
FIG. 9 is an enlarged fragmentary cross-sectional view showing the positional relationship between positive electrode terminals and the insulator in the battery holder shown in FIG. 7.

As shown in FIG. 8, the insulator 82 is inserted into the battery cavity 88 so as to cover the negative electrode terminals 90*a*, 90*b*. As shown in FIGS. 7 and 9, when the battery 94 is inserted into the battery cavity 88 over the insulator 82 and then the battery cover 76 is placed in an open end of the battery cavity 88, the battery 94 is securely held in the battery cavity 88. At this time, the insulator 82 remains inserted in the battery cavity 88 and extends through a gap between the open end of the battery cavity 88 and the battery cover 76.

Figure 10:
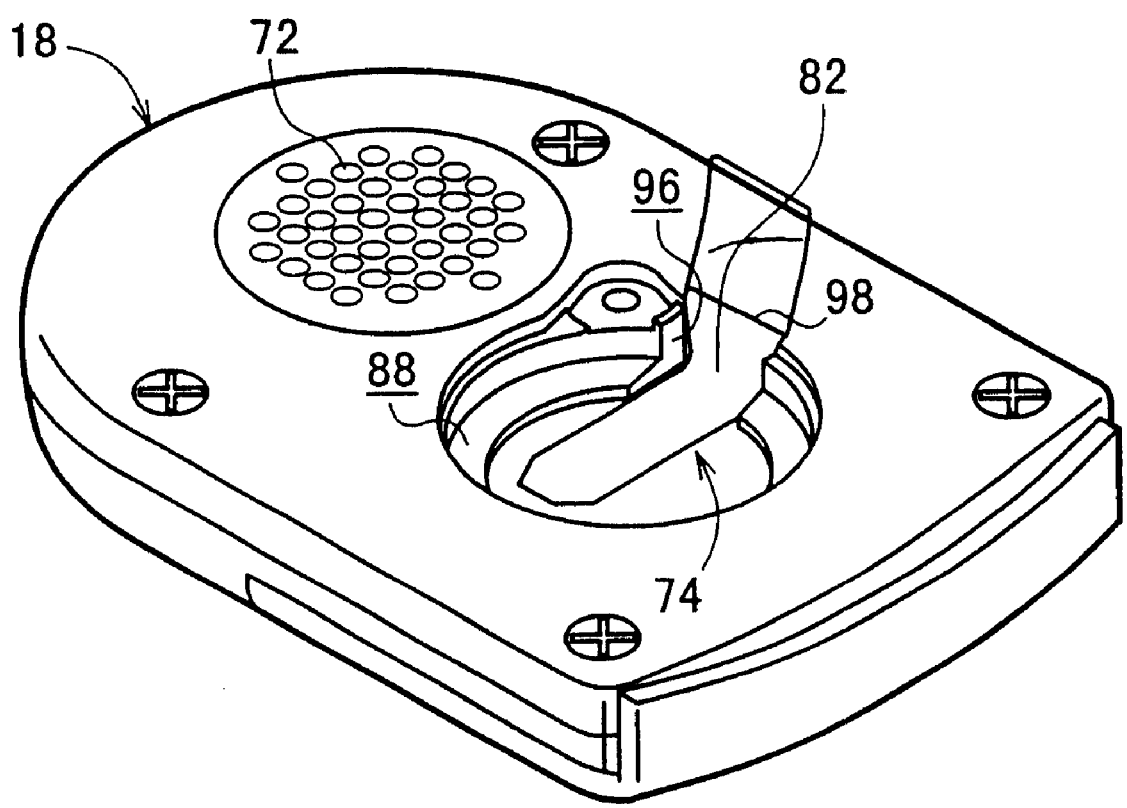
FIG. 10 is a perspective view showing the positional relationship between a slot and the insulator in the battery holder shown in FIG. 7.

Specifically, the insulator 82 is snugly fitted in a slot 96 defined in a peripheral edge of the battery cavity 88, as shown in FIG. 10. The insulator 82 snugly fitted in the slot 96 does not interfere with the battery 94 as it is placed into the battery cavity 88.

As shown in FIG. 9, since the battery 94 and the negative electrode terminals 90*a*, 90*b* are electrically insulated from each other by the insulator 82 of the sheet 80 that is interposed between the battery 94 and the negative electrode terminals 90*a*, 90*b*, the battery 94 is prevented from being unduly consumed.

As shown in FIGS. 4 and 9, a slip sheet 98 made of paper or the like for reducing frictional forces between the sheet 80 and the negative electrode terminals 90*a*, 90*b* is applied to the lower surface of the insulator 82 which faces the negative electrode terminals 90*a*, 90*b*. Therefore, when the insulator 82 is pulled out of the battery cavity 88, as described later on, no strong frictional forces are applied from the sheet 80 to the negative electrode terminals 90*a*, 90*b*.

Figure 11:
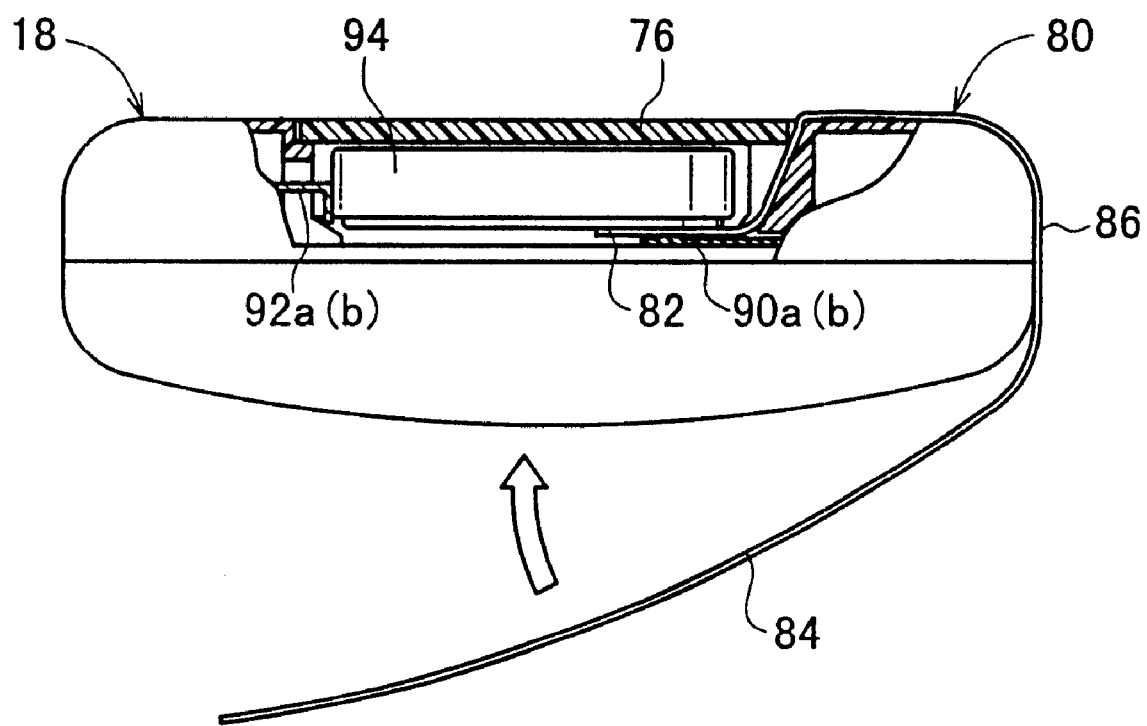
FIG. 11 is a rear view showing the manner in which the protector is placed on the color display panel shown in FIG. 6.
Figure 12:
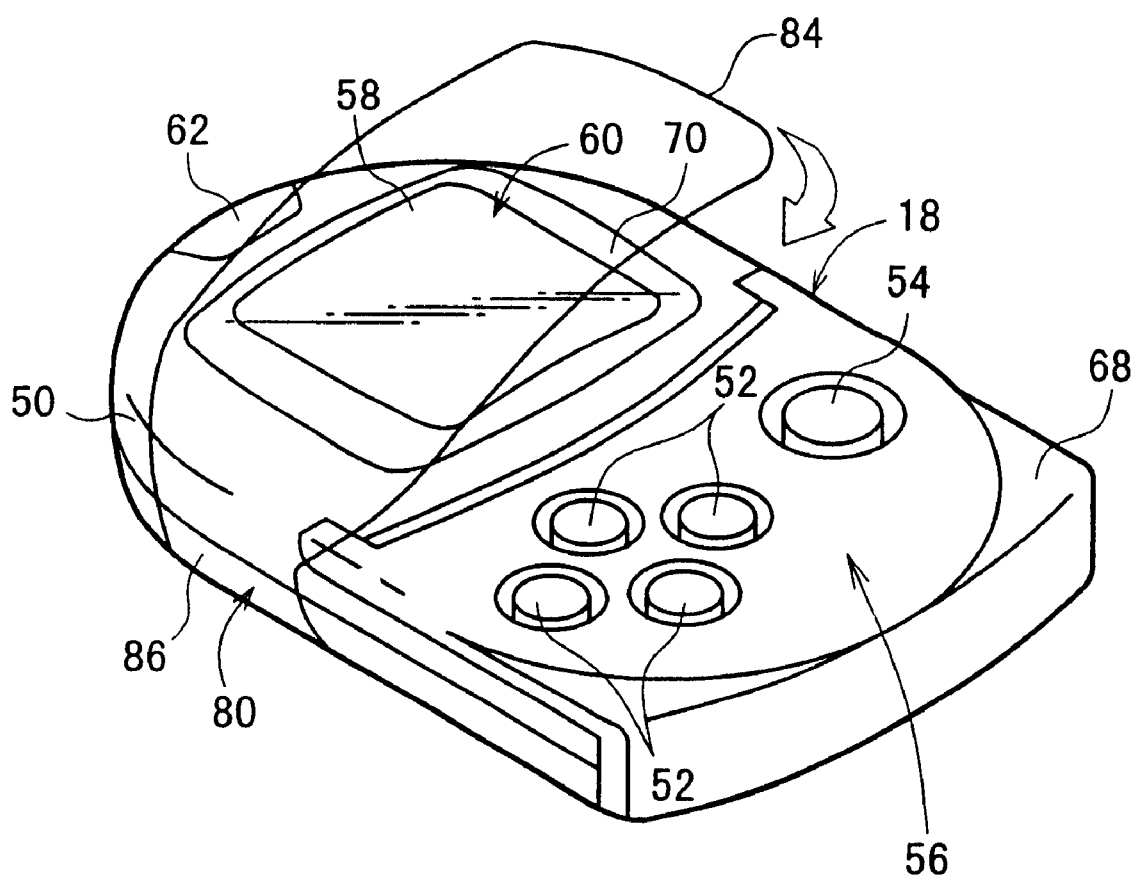
FIG. 12 is a perspective view showing the manner in which the protector is placed on the color display panel shown in FIG. 6.

As shown in FIGS. 11 and 12, the protector 84 of the sheet 80 is placed onto the color display unit 60 as follows: With the insulator 82 placed in the battery holder 74, the protector 84 is brought around the left side of the housing 50 onto the upper surface thereof. At this time, the bend 86 of the sheet 80 is held against the left side of the housing 50. As shown in FIG. 6, the protector 84 is placed on the surface of the panel protection plate 70 of the color display unit 60. Therefore, the sheet 80 is mounted on the portable information terminal 18 along outer surfaces of the housing 50 which range from the battery holder 74 to the color display unit 60.

Figure 13:
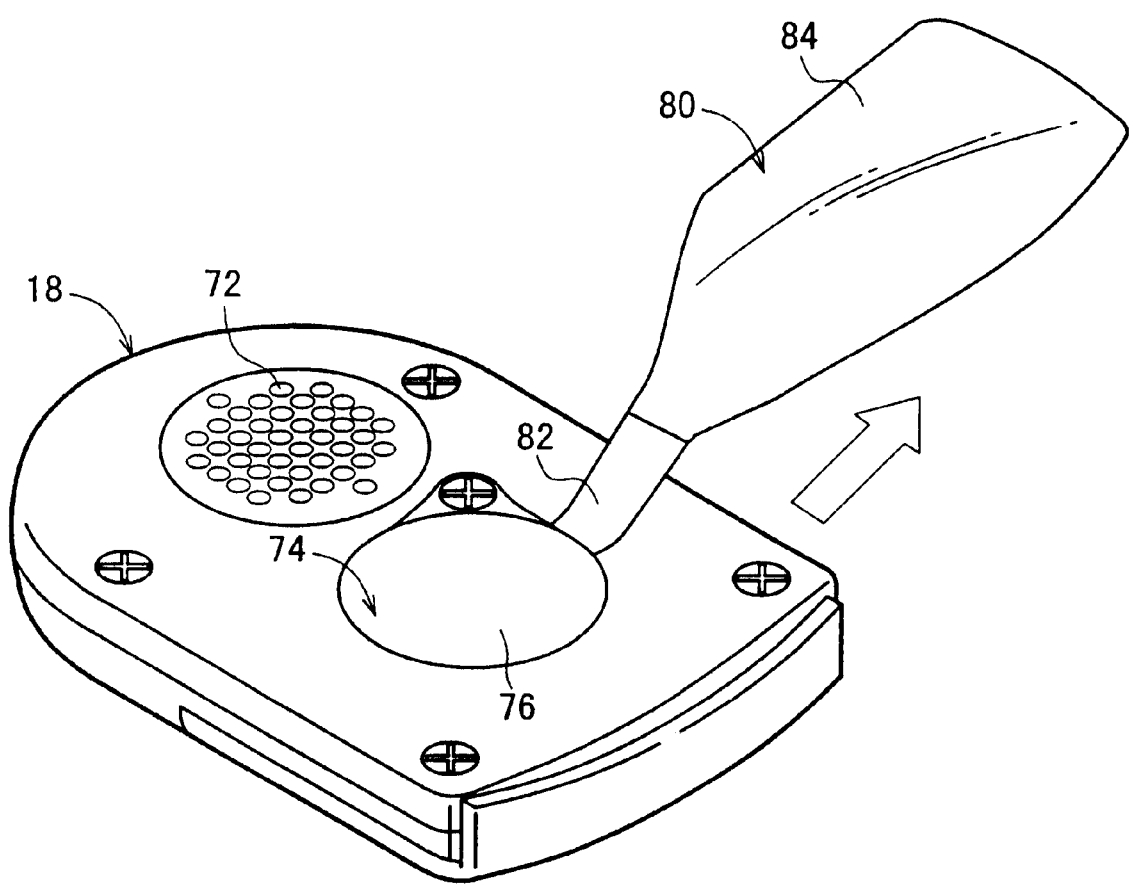
FIG. 13 is a perspective view showing the manner in which the insulator is pulled out of the battery holder shown in FIG. 5.
Figure 14:
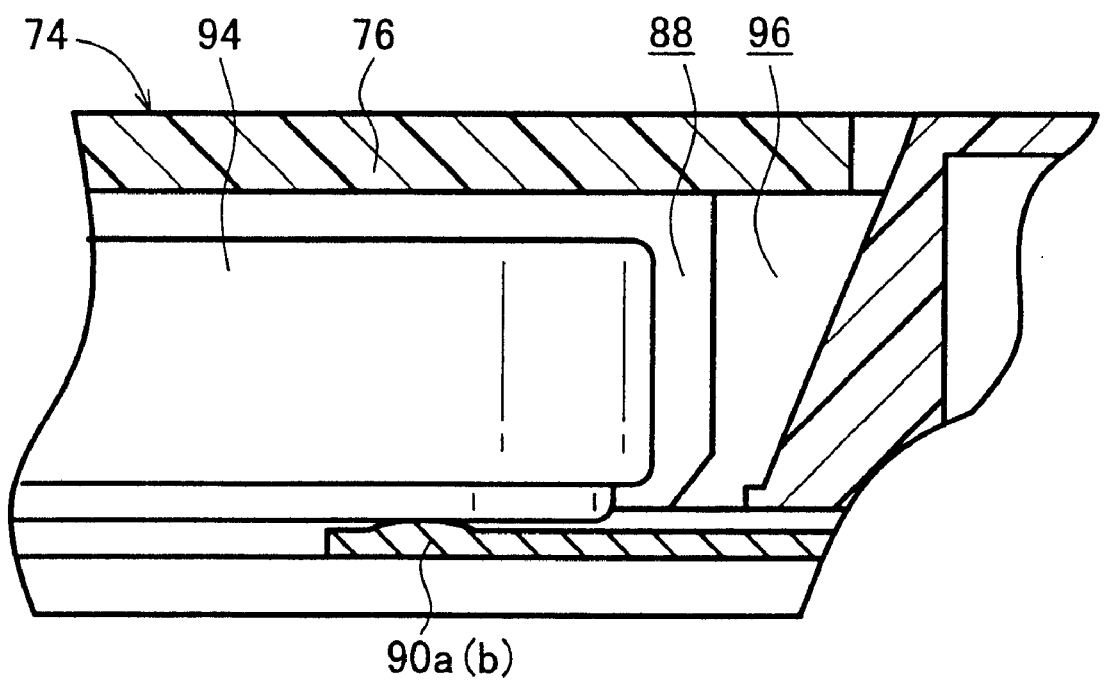
FIG. 14 is an enlarged fragmentary cross-sectional view showing the battery holder shown in FIG. 9 from which the insulator has been pulled out.

When the user wants to start using the portable information terminal 18, as shown in FIG. 13, the user peels the protector 84 off the color display unit 60, and then pulls the insulator 82 out of the battery holder 74. At this time, as shown in FIG. 14, the battery 94 is brought into electric contact with the negative electrode terminals 90*a*, 90*b*, and supplies electric energy to electric circuits in the portable information terminal 18.

As described above, the insulative/protective sheet 80 is of the unitary structure having the insulator 82 which electrically insulates the battery 94 and the negative electrode terminals 90*a*, 90*b* from each other and the protector 84 which protects the panel protection plate 70 of the color display unit 60. Consequently, the sheet 80 can be manufactured with greater ease and can be mounted on and removed from the portable information terminal 18 more easily than conventional insulative and protective sheets that are separate from each other.

The slip sheet 98 for reducing frictional forces between the insulator 82 and the negative electrode terminals 90*a*, 90*b* is applied to the surface of the insulator 82 which faces the negative electrode terminals 90*a*, 90*b*. Therefore, when the insulator 82 is pulled out of the battery cavity 88, strong frictional forces are prevented from being applied from the sheet 80 to the negative electrode terminals 90*a*, 90*b*.

Figure 15:
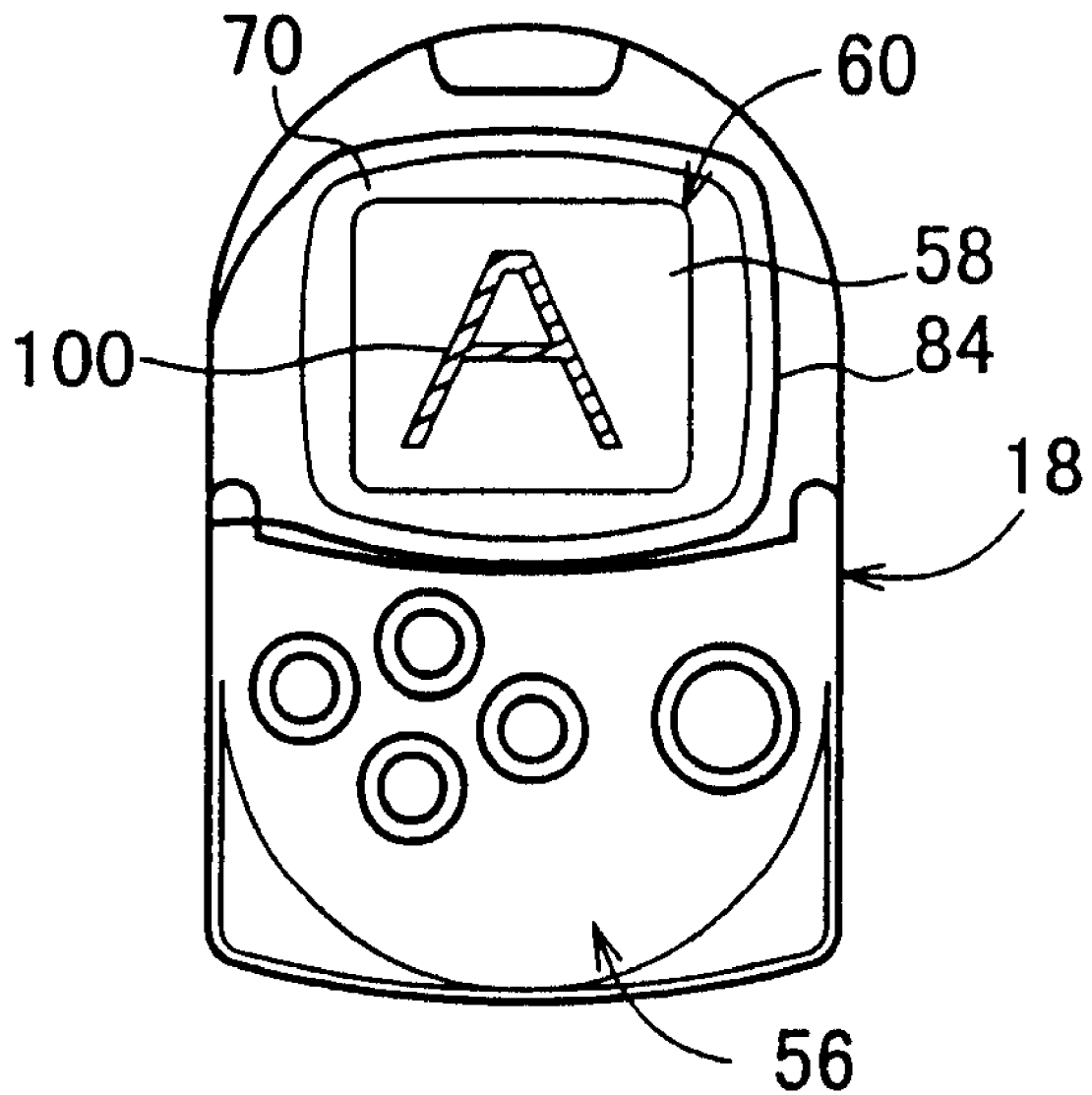
FIG. 15 is a plan view of a portable information terminal on which a sheet having a protector that carries a mark is mounted.
Figure 16:
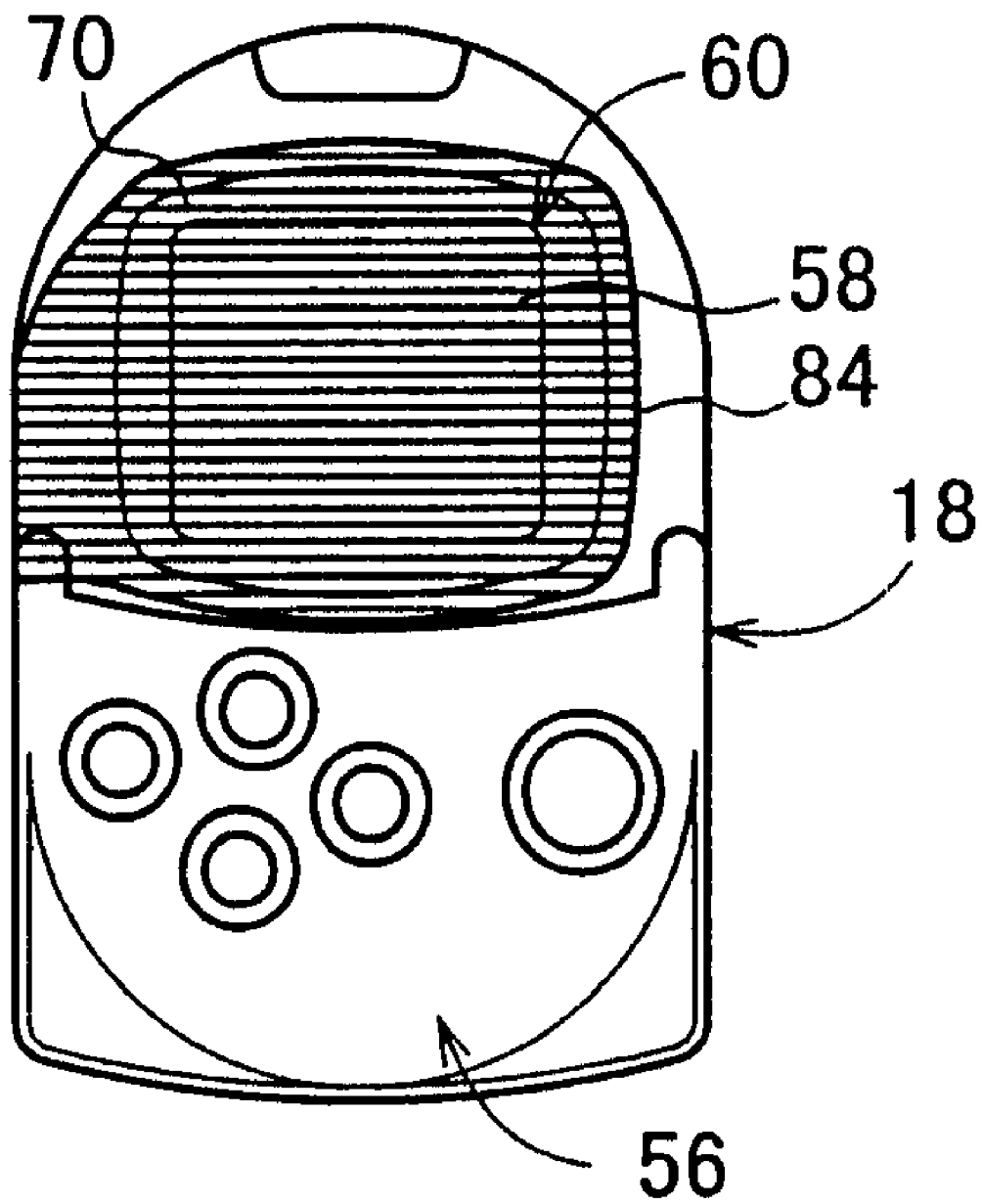
FIG. 16 is a plan view of a portable information terminal on which a sheet having a protector that carries an arbitrary color is mounted.
Figure 17:
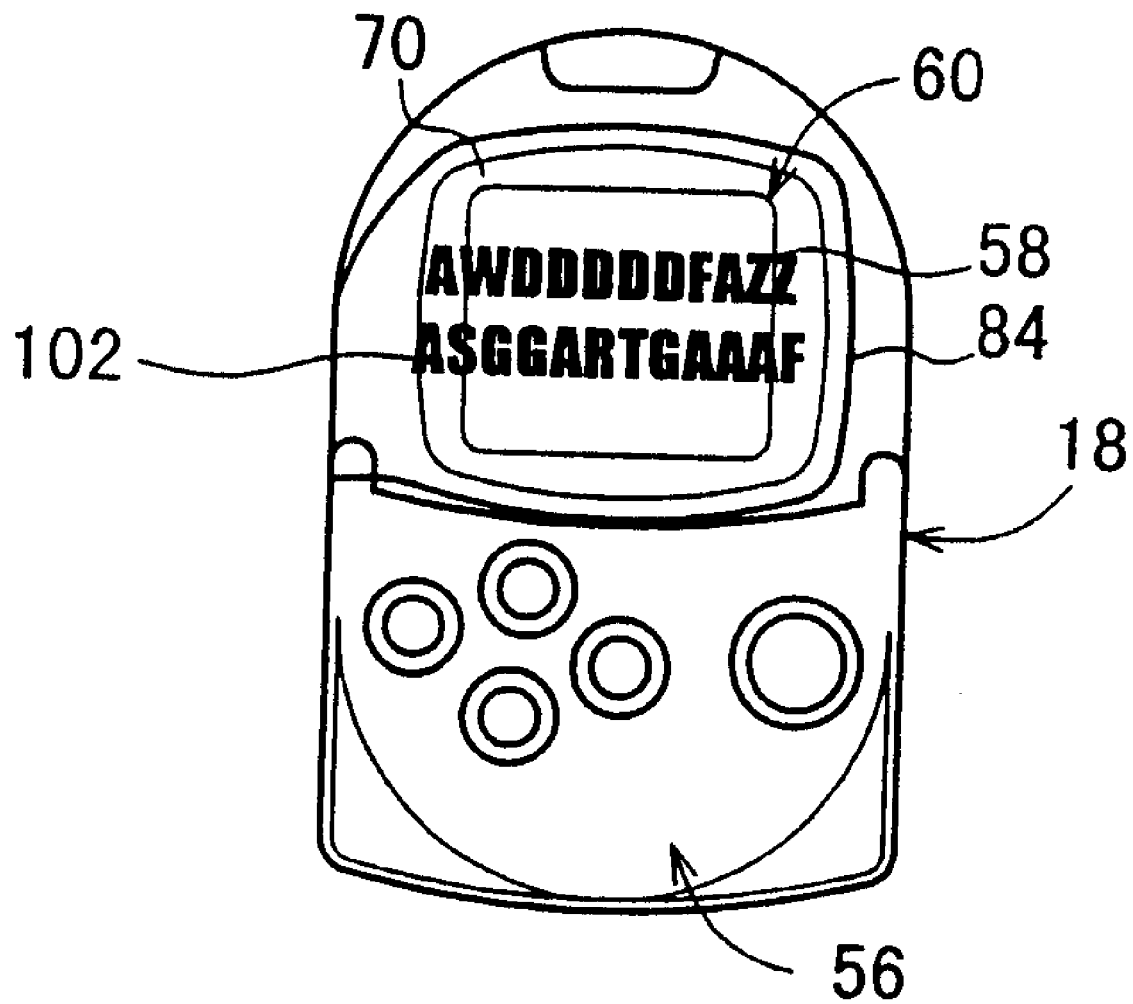
FIG. 17 is a plan view of a portable information terminal on which a sheet having a protector that carries letters is mounted.

The protector 84 of the sheet 80 may be either colorless and transparent or colored and transparent. As shown in FIG. 15, the protector 84 may be transparent and may have a mark 100 such as a logo. Alternatively, as shown in FIG. 16, the protector 84 may be transparent and may carry an arbitrary color. Further alternatively, as shown in FIG. 17, the protector 84 may be transparent and may have letters 102 for instructions, a warning, etc.

With the protector 84 being transparent, the user can immediately understand that the protector 84 serves the purpose of protecting the color display unit 60. However, the protector 84 may not necessarily be transparent.

The sheet 80 is applicable to portable information terminals including various devices having a display unit and energizable by a built-in battery, e.g., portable computers, electronic notebooks, portable telephone sets, PHS terminals, pagers, etc., clocks, remote commanders, desktop calculators, etc. In such different applications, the insulator 82, the protector 84, and the bend 86 are shaped depending on the positions and shapes of the display unit and battery holder of the devices.

As described above, the insulative/protective sheet according to the present invention has an insulator which electrically insulates a battery and electrode terminals from each other and a protector which protects a display panel, and is of a unitary shape made of synthetic resin. The insulative/protective sheet can be manufactured with ease and can easily be mounted on and removed from a portable information terminal. The present invention also provides a portable information terminal with such an insulative/protective sheet.

Although certain preferred embodiments of the present invention has been shown and described in detail, it should be understood that various changes and modifications may be made therein without departing from the scope of the appended claims.

What is claimed is:

1. An insulative/protective sheet comprising:
    an insulator for use between a built-in battery disposed in a portable information terminal and electrode terminals in the portable information terminal, for providing insulation between the battery and the electrode terminals; and
    a protector for being placed on a display panel of the portable information terminal, for protecting said display panel;
    said insulator and said protector being constructed as a unitary sheet.

2. An insulative/protective sheet according to claim 1, wherein said unitary sheet is made of synthetic resin.

3. An insulative/protective sheet according to claim 1, further comprising:
    a member disposed on a surface of said insulator which faces said electrode terminals, for reducing frictional forces applied to said electrode terminals.

4. An insulative/protective sheet according to claim 1, wherein said protector is transparent.

5. An insulative/protective sheet according to claim 1, wherein said protector carries a mark and/or letters.

6. A portable information terminal, comprising:
    a built-in battery;
    a display panel; and
    an insulative/protective sheet having an insulator for use between the built-in battery and electrode terminals in the portable information terminal, for providing insulation between the battery and the electrode terminals, and a protector placed on said display panel, for protecting said display panel;
    said insulator and said protector being constructed of a unitary structure.

7. A portable information terminal according to claim 6, wherein said insulative/protective sheet is made of synthetic resin.

8. A portable information terminal according to claim 6, wherein said insulative/protective sheet further comprises a member disposed on a surface of said insulator which faces said electrode terminals, for reducing frictional forces applied to said electrode terminals.

9. A portable information terminal according to claim 6, further comprising:
    a battery cavity with said electrode terminals disposed therein, said battery being housed in said battery cavity; and
    a battery cover placed in an open end of said battery cavity;
    said insulator being inserted in said battery cavity and extending through a gap between said open end of said battery cavity and said battery cover;
    said insulative/protective sheet being mounted along outer surfaces of said portable information terminal which range from said battery cavity in which said insulator is inserted to said display panel on which said protector is placed.

10. A portable information terminal according to claim 6, wherein said protector is transparent.

11. A portable information terminal according to claim 6, wherein said protector carries a mark and/or letters.

* * * * *